(Specimens.)

B. R. SEIFERT.
CARBONATE OF GUAIACOL AND CREOSOL.

No. 466,913. Patented Jan. 12, 1892.

Witnesses:
George Barry
C. E. Lundgren

Inventor:
Bruno Richard Seifert
By attorneys
Brown & Seward

UNITED STATES PATENT OFFICE.

BRUNO RICHARD SEIFERT, OF RADEBEUL, NEAR DRESDEN, GERMANY, ASSIGNOR TO DR. F. VON HEYDEN, NACHFOLGER, OF SAME PLACE.

CARBONATE OF GUAIACOL AND CREOSOL.

SPECIFICATION forming part of Letters Patent No. 466,913, dated January 12, 1892.

Application filed December 17, 1890. Serial No. 374,981. (Specimens.)

*To all whom it may concern:*

Be it known that I, BRUNO RICHARD SEIFERT, chemist, of Radebeul, near Dresden, in the Kingdom of Saxony, German Empire, have invented a new and useful Improvement in Medical Compounds, of which the following is a specification, reference being had to the accompanying drawings.

I have found that from guaiacol and its homologues—for instance, creosol contained in beech-wood tar—medical compounds may be obtained which are preferable to guaiacol, inasmuch as they are colorless, tasteless, and without effect upon the mucous membrane. These compounds are intended to be mainly used internally against tuberculosis and the diseases of the stomach and externally against the diseases of the skin and as an antiseptic.

Figure 1:
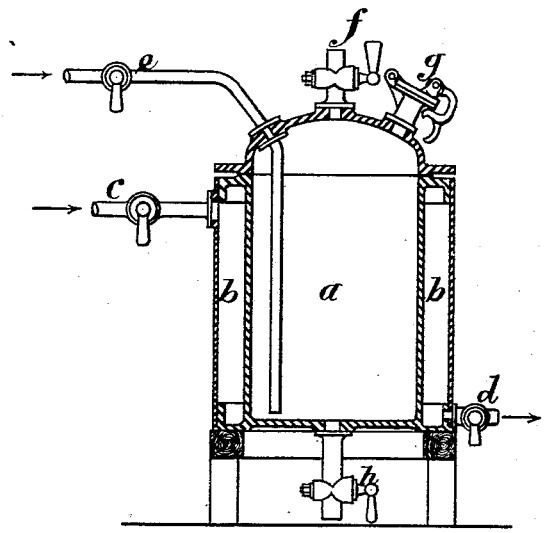
Figure 2:
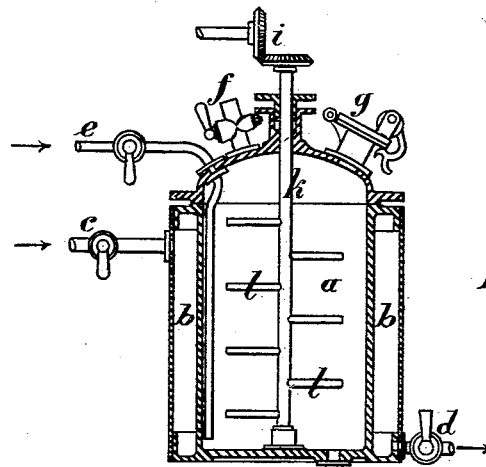
Figure 3:
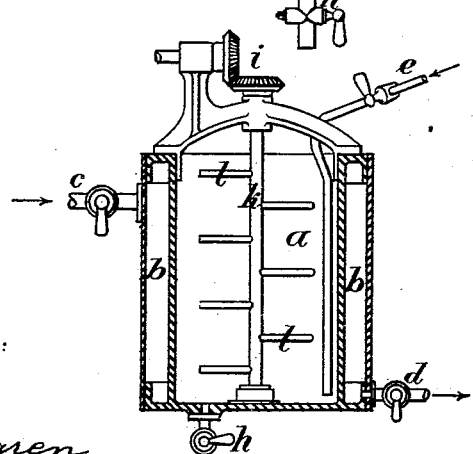

Figures 1, 2, and 3 represent central vertical sectional views of three different forms of apparatus which may be employed in the manufacture of my compounds.

My new medical compounds are obtained by the action of phosgene on guaiacol or the homologue creosol. The reaction takes place according to the following equation:

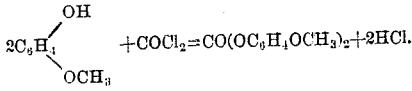

In carrying out the process I proceed as follows: Two hundred and fifty kilograms of guaiacol and one hundred kilograms of phosgene are heated in a closed vessel. A temperature of about 100° centigrade is sufficient. After several hours the vessel is opened to allow the hydrochloric vapors to escape. The residual product is washed with water, or, if necessary, with an alkaline solution, and thereafter crystallized from alcohol. For this process I preferably use the apparatus Fig. 1, in which $a$ is a closed vessel surrounded by a steam-jacket $b$, with the steam admission and outlet pipes $c$ and $d$.

$e$ is an inlet-pipe for the phosgene, and $g$ is an opening for the guaiacol to be put into the vessel $a$. This opening is provided with a suitable cover.

$f$ is an outlet-pipe for the hydrochloric vapors to escape, and $h$ is an outlet-pipe for the residual product to be drawn off.

Instead of guaiacol, a salt of it may be employed. In this case the reaction takes place, for instance, according to the following equation:

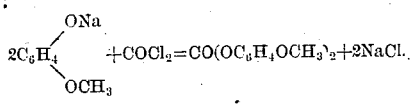

If a solid salt of guaiacol is employed, the apparatus Fig. 1 may be used; but I prefer to use an apparatus with an agitator. This apparatus is shown in Fig. 2, which is provided with or constituted of all the parts named in Fig. 1, and which are indicated in Fig. 2 by the same letters of reference; but this apparatus, Fig. 2, has, moreover, an agitator, which may be composed of an upright shaft $k$, with driving-gear $i$ at top and with stirrers $l$ within the vessel. If, however, a solution of guaiacol salt is employed, it is more simple and preferable to make use of an open vessel $a$—such, for instance, as Fig. 3—which is provided with agitator $i$ $k$ $l$, steam-jacket $b$, with pipes $c$ $d$, phosgene-inlet pipe $e$, and draw-off pipe and cock $h$.

Of course the apparatus Fig. 3 may be used instead of Fig. 2, and the one shown in Fig. 2 instead of that in Fig. 3.

The mode of proceeding with salt of guaiacol is as follows: The vessel Fig. 2 or Fig. 3 is charged with solid or dissolved guaiacol-salt, produced, for instance, from one hundred and twenty-five kilograms of guaiacol and forty and five-tenths kilograms of caustic soda. One hundred kilograms of phosgene are now admitted through pipe $e$ until the contents of the vessel react neutral. This process is carried on at any desired temperature and pressure, all the while stirring by the agitator. The residual product is thereafter washed with water and crystallized from alcohol. The product resulting from such reaction consists of the carbonate of guaiacol. It is colorless, tasteless, and melts at about 85° centigrade. Its structural formula is $CO(OC_6H_4OCH_3)2$. If creosol is used, the homologue carbonate results having the same characteristics, its structural formula being $$CO(OC_6H_3 {<}{{OCH_3}\atop{CH_3}} \} 2$$

and its melting-point about 145° centigrade.

The doses to be administered internally may be from one-tenth of one grain to ten grains.

What I claim is—

The carbonates of guaiacol and creosol herein described, which have the following characteristics, viz: a colorless crystalline powder, insoluble in water and soluble in alcohol and ether.

In testimony that I claim the foregoing as my invention I have signed my name in presence of two subscribing witnesses.

BRUNO RICHARD SEIFERT.

Witnesses:
WILHELM WIESENHÜTTER,
PAUL DRUCKEMÜLLER.